April 27, 1943. B. J. FLOCK 2,317,449
REACTOR
Filed Oct. 31, 1941 2 Sheets-Sheet 1

Inventor:
Bernard J. Flock
By Lee J. Gary
Attorney.

April 27, 1943. B. J. FLOCK 2,317,449
REACTOR
Filed Oct. 31, 1941 2 Sheets-Sheet 2

Inventor:
Bernard J. Flock
By Lee J. Gary
Attorney

Patented Apr. 27, 1943

2,317,449

UNITED STATES PATENT OFFICE 2,317,449

REACTOR

Bernard J. Flock, Chicago, Ill., assignor to Universal Oil Products Company, Chicago, Ill., a corporation of Delaware Application October 31, 1941, Serial No. 417,359

10 Claims. (Cl. 23—288)

This invention relates to an improved form of apparatus in which to conduct reactions in the presence of a mass of finely divided, solid contact material.

The apparatus is adapted for use in a wide variety of chemical processes wherein the contact mass comprises either a relatively inert material employed principally to give greater surface and contact area between the reactants, or wherein it is catalytically active for promoting the desired reaction or retarding undesired side reactions, or wherein it is a material which enters into the reaction. It will be found particularly advantageous as applied, for example, to the catalytic cracking and catalytic dehydrogenation of hydrocarbons and other reactions in which deleterious heavy conversion products, such as carbonaceous or hydrocarbonaceous materials, for example, are deposited in the mass of catalyst or contact material and must be periodically removed to restore its catalytic or other beneficial effect.

The reactor provided is of the type employing a plurality of superimposed trays disposed within an elongated reaction vessel, each of said trays being disposed to contain a bed of solid granular catalyst or contact material, through which beds the fluid reactants to be converted and the fluid employed for regenerating the catalyst or contact material is passed under conditions regulated to effect the desired reaction or regeneration within the contact mass.

It has heretofore been necessary in tray type reactors of the general class above mentioned to provide a removable head on the reaction vessel which spans substantially the entire cross-sectional area of the vessel so as to provide a large opening through which the trays can be inserted and removed from the vessel. This practice is obviated in the present invention by constructing the trays in substantially segmental sections which may be inserted through a man-way or similar relatively small opening in the vessel and assembled within the shell.

The features and advantages of the segmental or sectional trays provided by the invention will be more apparent with reference to the accompanying diagrammatic drawings and the following description thereof.

In the drawings, Fig. 1 is an elevational view, shown partially in section, of one specific form of reactor and sectional trays therefor provided by the invention.

Figure 1:
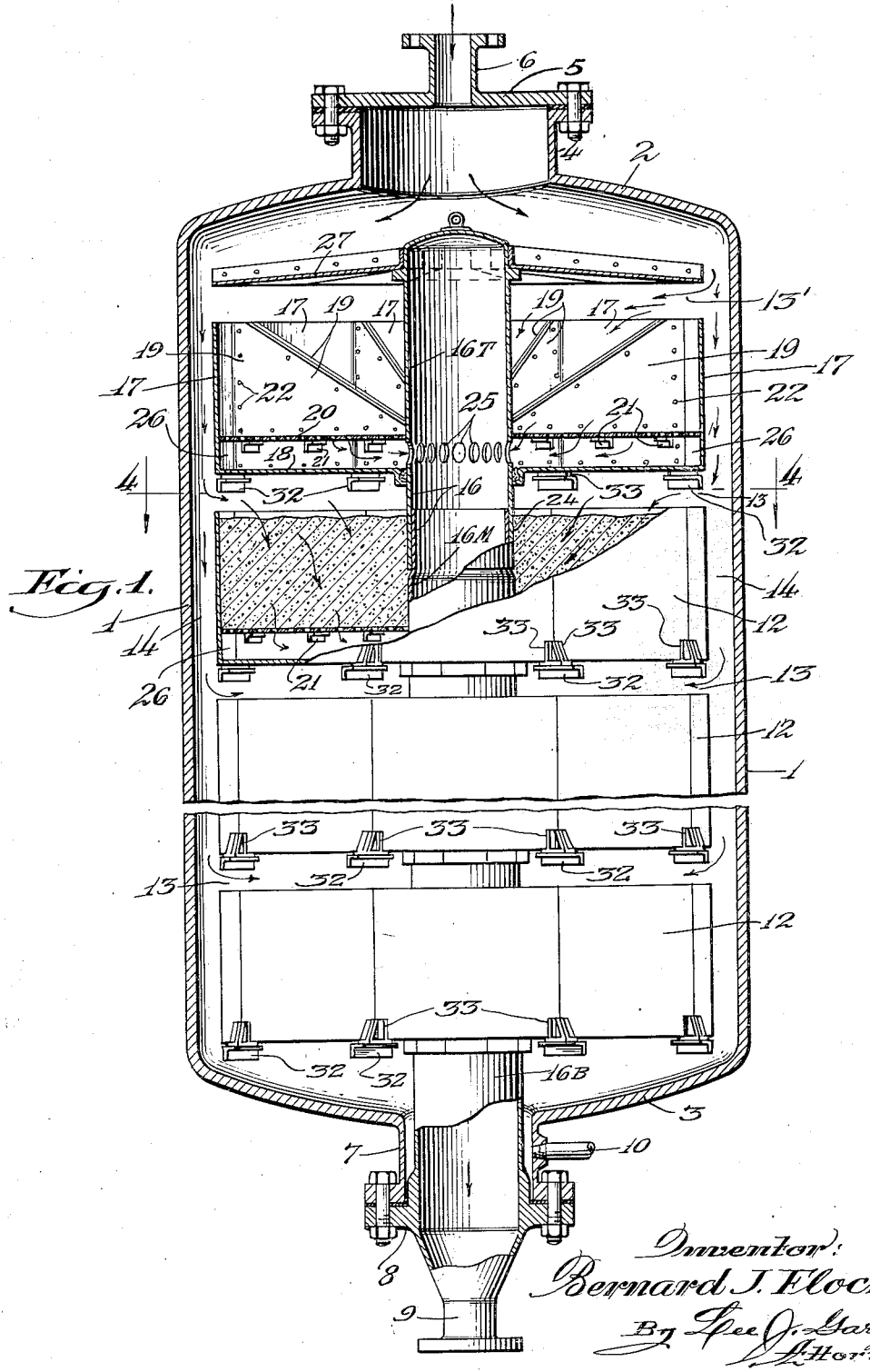
Figure 4:
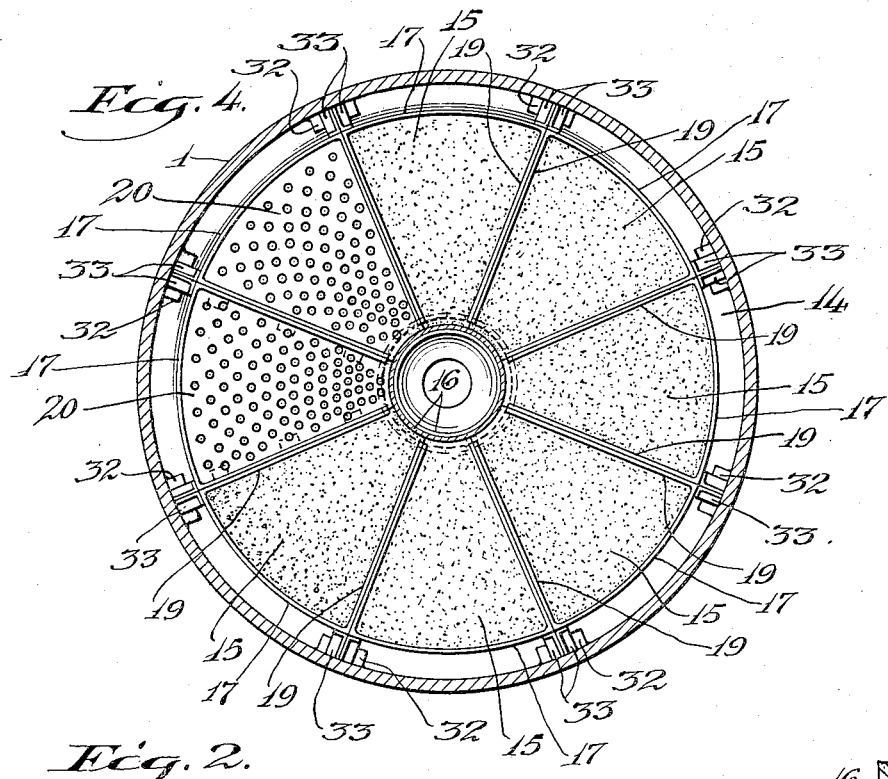
Fig. 4 is a plan view of one of the reactor trays and a cross-sectional view of the central off-take conduit taken on the line 4—4 of Fig. 1.

Referring to the drawings, the elongated substantially cylindrical shell of the reactor is shown in Figs. 1 and 4 and is designated by the reference numeral 1. It is provided with an integral upper head 2 and an integral lower head 3. A flanged man-way nozzle 4 or other suitable means of access to the interior of the vessel is provided on upper head 2 and a flange or similar closure member 5 is bolted or otherwise detachably secured to the man-way and, in this particular instance, carries the inlet nozzle 6 for reactants and regenerating gases. Another flanged nozzle or man-way 7 is provided on the lower head 3 and is provided with a bolted flange or cover plate 8 to which outlet nozzle 9 is attached. A suitable drain connection 10 is provided at the lower end of the vessel.

A plurality of trays 12 is disposed within the shell of the reactor, the individual trays being arranged within the shell in superimposed spaced apart relation with a space 13 provided between each pair of adjacent trays and an annular space 14 provided between the outer periphery of the trays and the inner surface of shell 1.

A bed of granular catalyst or contact material, indicated at 15 in Fig. 1, is disposed within each of the trays 12 in the annular space provided between the outer wall of the tray and the central off-take conduit 16. The bed of catalyst or contact material has been omitted in the uppermost tray of Fig. 1 to better illustrate its interior construction.

Figure 2:
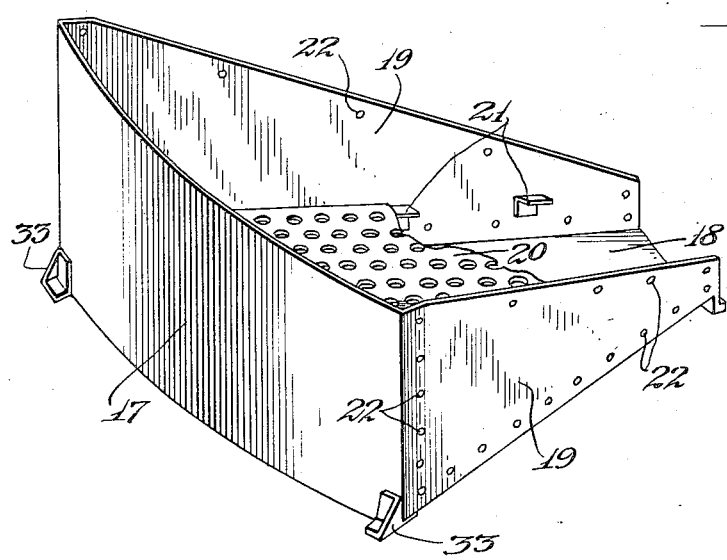
Fig. 2 is a perspective view of one of the individual sections of the trays of Fig. 1.

Each of the trays 12 comprises a plurality of substantially segment shaped sections, such as illustrated in Fig. 2, which are sufficiently small to pass through the upper man-way 4 and are assembled within the reactor. Each of the tray sections or segments comprises an outer wall 17, substantially conforming in curvature to the arc of the circle defined by the tray, a substantially segment shaped bottom wall 18 and substantially triangular side walls 19 joined along their rectilinear edges to the outer wall 17 and bottom wall 18 by welding or in any other convenient manner or, when desired, the walls 17, 18 and 19 may be formed from a single metal sheet or plate. A substantially segment shaped plate or false bottom 20 is provided in each of the tray sections, this member being shown partially cut away in Fig. 2 and shown in only a portion of the tray sections in Fig. 4. Member 20 is spaced a short distance above bottom wall 18 and may be supported, for example, as indicated in Fig. 2, on angle clips or the like 21 welded or otherwise secured to the tray sections.

Spaced bolt holes 22 are provided through the substantially triangular walls 19 of the tray sections adjacent their edges, the bolt holes in the individual sections being aligned so that they may be assembled and bolted together, as illustrated in Fig. 4, to form the tray.

The bottom wall 18 and side walls 19 of the tray sections terminate short of the apex formed by lines extending along their sloping edges so that when the sections are assembled, as in Fig. 4, a central opening is provided for the reception of off-take conduit 16. This central off-take conduit extends through the assembled trays within the reactor, as shown in Fig. 1, and comprises a plurality of intermediate sections 16M, an upper section 16T and a bottom section 16B which are joined by slip joints, such as indicated at 24 in Fig. 1, to form a continuous conduit extending from above the uppermost tray of the assembly to the bottom outlet 9. The top conduit section 16T is closed at its upper end and the bottom conduit section 16B is joined at its lower end to the flange or closure member 8. The central conduit 16 is provided with openings 25 through its walls at the elevation of each of the spaces 26 (see Figs. 1 and 3) between the bottom 18 and false bottom 20 of each tray.

A baffle 27, formed by a plurality of substantially segmental sections which pass through man-way nozzle 4 and are bolted together within the reactor, is supported on the central conduit 16 adjacent its upper end at a spaced distance from the upper extremity of the uppermost tray of the assembly to provide a space 13' therebetween similar to the spaces 13 between adjacent trays. The function of this baffle is to direct incoming fluid reactants and regenerating gases supplied to the reactor through nozzle 6 above the baffle into the annular space 14 between the trays and the shell 1.

Figure 3:
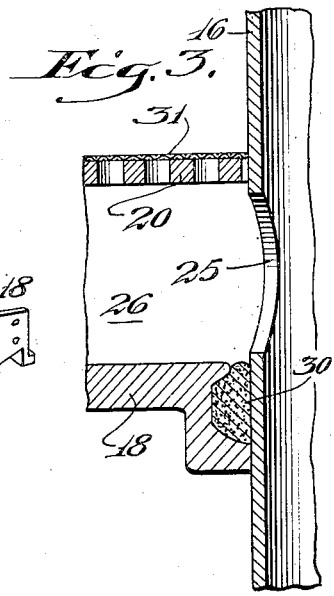
Fig. 3 is an enlarged fragmentary, sectional detail of a portion of one of the reactor trays taken at the juncture thereof with the central off-take conduit.

As shown in Fig. 3, the bottom wall 18 of each of the tray sections is constructed to provide a space between the bottom wall and the central conduit 16 for the reception of suitable packing, indicated at 30, which serves to seal the spaces between the trays from communication with the space enclosed by the central off-take conduit 16, except through the beds of catalyst or contact material in the trays.

As indicated in Fig. 3, I also contemplate providing, when desired, a suitable screen 31 above the perforate plate or false bottom 20, particularly when the particle size of the catalyst or contact material is relatively small, the screen being of sufficiently small mesh to retain the particles and prevent their sifting into the space 26.

The trays 12 are individually supported from the shell 1 of the reactor by means of spaced lugs 32 secured to the shell and spaced lugs 33 secured to the trays. This supporting arrangement, together with the slip joint 24 between the sections of the central conduit 16 and the packed joint 30 between the trays and the conduit, permit independent expansion and contraction of the trays, shell and central conduit, thus avoiding stresses in the structure due to changes in temperature during operation and due to differential temperatures in different parts of the structure.

To assemble the reactor, the segmental sections for the lowermost tray are lowered into shell 1 through the upper man-way 4 and are bolted together by a workman stationed within the shell. When assembled, the lowermost tray is mounted on the supporting lugs, the lower cover plate 8 and lower conduit section 16B is placed in position and the packing between this conduit section and the tray is installed. The tray is then filled or substantially filled with the catalyst or contact material after the perforate plates 20 and screens 31 (when the latter are employed) have been installed. One of the intermediate conduit sections 16M is slipped over the upper end of section 16B and the next adjacent tray is assembled in the same manner. The intermediate tray and uppermost tray are assembled, one at a time, in the same manner as the lowermost tray, the conduit sections being added to the structure and the catalyst or contact material placed in the trays as they are individually completed. The baffle 27 is assembled within the reactor and installed on the upper end of conduit 16T after the uppermost tray is assembled and filled with catalyst or contact material and the vessel is then headed up, tested and conditioned for operation.

During operation, the fluid reactants to be converted are supplied in heated state to the vessel through inlet nozzle 6 and are directed by baffle 27 into the annular space 14 between the trays and the shell wherefrom they flow as a plurality of separate streams of substantially equal volume into the spaces 13 and 13' and are thence directed downward into the several beds of catalyst or contact material in the trays. The desired reaction takes place within these beds and resulting products pass from the individual catalyst beds into the spaces 26 of the trays from which they are directed through openings 25 into the central conduit 16. The several streams from the individual catalyst beds combining in conduit 16 are directed therefrom through outlet nozzle 9 to suitable separating and recovery equipment not pertinent to the present invention.

After a period of operation the catalyst or contact material will require regeneration and to accomplish its regeneration in situ without interrupting the conversion process, the incoming reactants are diverted to a preconditioned similar reactor containing fresh or freshly regenerated catalyst or contact material. In the case of hydrocarbon conversion reactions, such as catalytic cracking, dehydrogenation and the like, regeneration of the catalyst is accomplished by burning deposited deleterious heavy hydrocarbonaceous material which accumulates in the catalyst bed during the conversion reaction therefrom in a stream of hot oxygen-containing gases. In such instances, to regenerate the catalyst the reactor is purged of fluid reactants and conversion products after the stream of reactants to be converted is diverted to another reactor and hot oxidizing gases then admitted to the purged reactor to flowing through the catalyst beds in the same manner, previously described, as the reactants, and burning the deleterious deposits from the catalyst beds as they pass therethrough. Following regeneration, as above described, the reactor may be purged of oxidizing gases and combustion products and the stream of reactants to be converted may then be again supplied to this reactor to continue the operation.

After a prolonged period of operation involving numerous regenerations of the catalyst or contact material, its activity will become permanently impaired to such an extent that it is economical to replace it. When replacement is necessary, the top and bottom heads are removed from the reactor and the baffle 27 is disassembled and removed. Then by withdrawing the upper section 16T of the central conduit, the contact material from the uppermost tray may be raked or shoveled into the remaining portion of the central conduit through which it is discharged from the bottom man-way 7. The remaining sections 16M of the central conduit are then removed, one at a time, through the upper man-way and the catalyst discharged in the same manner from the bed thus exposed to communication with the remaining portion of the central conduit. Following emptying of the trays, they are refilled with fresh catalyst or contact material the sections of the central conduit being replaced one at a time in their respective trays before that tray is filled. The bottom cover plate 8 and conduit section 16B is replaced before the lowermost tray is filled. It will thus be apparent that the spent catalyst or contact material may be readily replaced without disassembling and removing the trays by virtue of the arrangement and construction of the central conduit, thus greatly simplifying and expediting this operation.

I claim as my invention:

1. In a tray type reactor of the class described having an outer shell, a plurality of trays, each adapted to contain a bed of solid granular contact material, disposed within said shell in superimposed, spaced apart relation, each of said trays comprising a plurality of individual, inter-engaged, substantially segmental sections.

2. An apparatus of the class described comprising, in combination, an elongated substantially cylindrical reaction vessel closed at its upper and lower ends, at least one of said closed ends having an access opening therethrough with removable closing means therefor, a plurality of trays, each adapted to retain therein a bed of solid granular contact material, said trays being arranged within the shell in superimposed, spaced apart relation, each of said trays comprising a plurality of individual, inter-engaged, substantially segmental sections and said sections being of such size and shape that they may be individually passed through said access opening.

3. The apparatus defined in claim 2 wherein said trays are individually supported from the shell of the vessel.

4. The apparatus defined in claim 2 wherein a central offtake conduit, separable from the trays, is provided through the several trays, with means at the level of each tray for admitting fluid from the tray to said central conduit and means for discharging fluid from said central conduit and from the vessel.

5. The apparatus defined in claim 2 wherein a longitudinally continuous annular space is provided between the trays and the shell of the vessel, and with means for admitting fluid to the vessel and into said annular space.

6. A reactor of the class described comprising, in combination, an elongated, substantially cylindrical shell having upper and lower heads integral therewith, said heads each being provided with an access opening therethrough, detachable closure means for said access openings, a plurality of relatively shallow, substantially cylindrical trays arranged within said shell in superimposed spaced apart relation, the spaces between the trays communicating with an annular space provided between the trays and said shell and a central opening being provided through each of the trays, a conduit closed at its upper end and disposed lengthwise of the shell and tray assembly in the central openings through the trays, means in each of said trays for retaining therein a bed of granular contact material, a space being provided beneath said bed in each of the trays, openings being provided in said central conduit at the level of the last named space in each tray, means preventing the passage of fluid from the spaces between the trays into said central conduit except through said beds of contact material, means for admitting fluid to the reactor and into said annular space about the trays, means for removing fluid from said central conduit and from the reactor, each of said trays comprising a plurality of substantially segmental sections of such size and shape that they may be individually passed through one of said access openings, and means permitting the assembly of said sections within the shell to form the trays.

7. A tray for reactors of the class described comprising a plurality of substantially segmental sections detachably joined to form a structure having an upstanding substantially cylindrical outer wall and a substantially circular bottom wall, said bottom wall having a centrally disposed opening therethrough, and a substantially segmental perforate plate spaced within each of said segmental sections intermediate said bottom wall and the upper extremity of said outer wall.

8. The combination with the tray defined in claim 7 of an open ended conduit section adapted to fit within said opening in the bottom wall of the tray and having openings provided through its wall at the level of the space between said perforate plate and the bottom wall of the tray when said conduit section is in place on the tray.

9. In combination with the tray defined in claim 7, an open ended conduit section adapted to fit within said opening in the bottom wall of the tray and to extend from above said perforate plates to beneath said bottom wall, and means sealing the space between said conduit section and the opening in the bottom wall, one end of said conduit section being constructed and arranged to nest within the opposite end of a substantially identical conduit section to form a continuous conduit for a plurality of like trays, and openings provided through the wall of said conduit section at the level of the space provided between said perforate plates and the bottom wall of the tray when said conduit section is in place on the tray.

10. A sectional tray for reactors of the class described, said tray being substantially cylindrical and having an upstanding outer wall, a substantially circular bottom wall, upstanding radial walls connecting the bottom wall with the outer wall, and a perforate false bottom disposed above said bottom wall within the confines of said outer wall, the sections comprising the tray being substantially segmental and joined along edge portions thereof.

BERNARD J. FLOCK.